United States Patent [19]

Eventoff et al.

[11] Patent Number: 4,622,501

[45] Date of Patent: Nov. 11, 1986

[54] ULTRASONIC SECTOR SCANNER

[75] Inventors: Arnold T. Eventoff, Pleasantville; Fred R. Stolfi, Shrub Oak, both of N.Y.

[73] Assignee: North American Philips Corporation, New York, N.Y.

[21] Appl. No.: 732,339

[22] Filed: May 10, 1985

[51] Int. Cl.[4] ............... A61B 10/00; G05G 5/00
[52] U.S. Cl. ................... 318/627; 73/620; 128/660; 174/52 R; 174/DIG. 8
[58] Field of Search .......... 318/627; 128/660; 367/87, 95, 96, 97; 73/620; 310/89; 174/52 R, DIG. 8

[56]  References Cited

U.S. PATENT DOCUMENTS

| | | | |
|---|---|---|---|
| 1,061,624 | 5/1913 | Moore | 310/37 |
| 1,851,543 | 3/1932 | Bossard | 310/37 |
| 2,601,517 | 6/1952 | Hammes | 172/373 |
| 3,221,191 | 11/1959 | Cuches et al. | 310/36 |
| 3,351,830 | 11/1967 | Samson et al. | 318/48 |
| 3,434,025 | 3/1966 | Parkinson et al. | 318/8 |
| 3,679,953 | 7/1972 | Bedford | 318/138 |
| 3,831,076 | 8/1974 | Burke et al. | 318/627 |
| 4,130,769 | 12/1978 | Karube | 310/46 |
| 4,241,412 | 12/1980 | Swain | 364/731 |
| 4,323,828 | 4/1982 | Terada et al. | 318/45 |
| 4,407,293 | 10/1983 | Suarez et al. | 128/660 |
| 4,479,031 | 10/1984 | Kojima et al. | 174/DIG. 8 |
| 4,494,549 | 1/1985 | Namba et al. | 128/660 |
| 4,517,985 | 5/1985 | Teslawski et al. | 73/620 |

FOREIGN PATENT DOCUMENTS

| | | |
|---|---|---|
| 0062315 | 10/1982 | European Pat. Off. ............ 128/660 |
| 934537 | 10/1955 | Fed. Rep. of Germany . |
| 1027777 | 7/1958 | Fed. Rep. of Germany . |
| 2030789 | 11/1971 | Fed. Rep. of Germany . |

Primary Examiner—B. Dobeck
Attorney, Agent, or Firm—Marc D. Schechter

[57]  ABSTRACT

An ultrasonic sector scanner includes first and second magnetizable stators spaced on a longitudinal axis. First and second rotors are provided in the gaps between the end faces of the first and second stators, respectively. The rotors have tapered surfaces spaced from the end faces of the stators to form gaps therebetween. The gaps between the first rotor and the end face of the first stator decrease as the rotor rotates in a first direction. The gaps between the second rotor and the end faces of the second stator decrease as the rotors rotate in a second direction opposite the first direction. An ultrasonic transducer is connected to the rotors and arranged to be rotatable with the rotors. A servo-control system is provided to cause the rotor/transducer assembly to rotate according to a prescribed reference signal.

The ultrasonic sector scanner has a cover assembly in which a flexible membrane is provided with ribs which engage grooves in the wall of the housing. A heat-shrink tube or other retaining ring is arranged around the flexible membrane in order to press the ribs into the grooves.

The ultraonic sector scanner includes a rigid nose piece inside and spaced from the flexible membrane in order to increase the skin contact area when the flexible membrane of the sector scanner is pressed against the skin of a patient being examined.

16 Claims, 5 Drawing Figures

ULTRASONIC SECTOR SCANNER

BACKGROUND OF THE INVENTION

The invention relates to ultrasonic sector scanners, and motors, control systems, cover assemblies and nose pieces therefore. Such devices are used, for example, in medical diagnostics.

In ultrasonic "A-scanners", an ultrasonic transducer generates an acoustic pressure signal and projects the signal in a straight line through a body. The projected signal is scattered along its path of propagation, and as a result generates an echo acoustic pressure signal. The echo pressure signal contains information regarding the nature of the body along the path of propagation. The ultrasonic transducer receives the echo pressure signal and converts it into an electrical signal.

A two-dimensional image of a cross-section through the body is obtained in an ultrasonic "A-scanner", by pivoting the ultrasonic transducer through a selected angular range in order to scan the cross-sectional layer. Each electrical echo signal then represents an image of a radial line in the layer; all the electrical echo signals together represent an image of a pie-shaped cross-sectional layer of the body. By suitable processing of the electrical echo signals and an accurate measure of the pivot angle of the transducer, an image of the layer can be displayed on, for example, a cathode ray tube screen.

In practice, the ultrasonic transducer is not pivoted only one time through the selected angular range. In practice, the transducer is oscillated back and forth many times. Each repeated oscillation of the transducer produces a new image of the cross-sectional layer of the body, thus resulting in real-time imaging of the layer.

The motor used to oscillate the ultrasonic transducer must supply torque (i) to periodically reverse the direction of rotation of the transducer, (ii) to overcome frictional losses, for example due to the fiscous drag of the liquid in which the transducer is typically immersed, and (iii) to cause the transducer to track a reference signal when a servo-control system is utilized. The torque required to overcome frictional losses is usually relatively small. Moreover, preferably the angular velocity of the transducer is constant throughout the scan thereby requiring a small tracking torque. Accordingly, typically 75%–90% of the torque requirement of the scanning device arises from the direction-reversal requirement.

As mentioned above, the ultrasonic transducer is typically immersed in a liquid coupling medium. In order to contain this liquid in the ultrasonic sector scanner, the ultrasonic transducer and motor are covered with either a rigid dome or with a dome-shaped flexible membrane. When a membrane is used, the membrane is sealed to the housing of the sector scanner with an adhesive to prevent leakage of the coupling liquid. When replacement of the flexible membrane becomes necessary, one must first remove the old membrane, then remove the old adhesive, then reapply new adhesive and affix the new membrane. As a result, replacement of the flexible membrane is a delicate and time consuming process.

Moreover, in existing ultrasonic sector scanners, a rigid nose piece partially covers the transducer/motor assembly. The nose piece is provided to protect this assembly from damage due to direct contact with the flexible membrane, when the membrane is pressed against a patient being examined. An opening is provided in the nose piece for transmission of ultrasonic waves therethrough. The flexible membrane is then stretched over the nose piece to seal the housing.

SUMMARY OF THE INVENTION

It is an object of the invention to provide an ultrasonic scanner having a motor capable of generating the high torque necessary to oscillate a transducer with a constant rotational velocity.

It is a further object of the invention to provide an ultrasonic sector scanner having a motor capable of generating the high torque necessary for the quick rotation reversals of an oscillating transducer.

It is another object of the invention to provide an ultrasonic scanner with a servo-control system for accurately and precisely determining the angular position and velocity of the transducer.

It is yet a further object of the invention to provide an ultrasonic sector scanner with an easily replaceable flexible membrane cover.

It is still another object of the invention to provide an ultrasonic sector scanner having an increased skin contact area when pressed against the skin of the patient being examined.

An ultrasonic sector scanner according to the invention includes first and second stators, first and second rotors, and an ultrasonic transducer. The stators and rotors all have magnetic permeabilities greater than that of air. Each stator has two end faces opposite each other with a gap therebetween. The end faces of each stator are arranged on opposite sides of a longitudinal axis. The first stator is spaced from the second stator in the longitudinal direction.

Each rotor is arranged on the longitudinal axis between the end faces of a stator. The rotors are arranged to be rotatable together about the longitudinal axis. The first rotor has an outer surface surrounding the longitudinal axis which is spaced from the end faces of the first stator by gaps having thicknesses which decrease as the rotor rotates less than 360° in a first direction from a first angular position to a second angular position. The second rotor has an outer surface which is spaced from the end faces of the second stator by gaps having thicknesses which decrease as the rotor rotates less than 360° in a direction opposite to the first direction from the second angular position to the first angular position.

The ultrasonic transducer is connected to the rotors and arranged to be rotatable about the longitudinal axis with the rotors.

Preferably, the ultrasonic sector scanner further comprises means for generating magnetic flux in the stators. The magnetic flux-generating means may comprise conductive wire coils wound around the stators and driver means for alternately supplying electric currents to the stator coils.

The end faces of each stator are preferably symmetrical about the longitudinal axis. It is also preferred that each stator define a magnetic flux path parallel to a plane which is perpendicular to the longitudinal axis.

The rotors and stators in the ultrasonic sector scanner according to the invention may be made of ferromagnetic material, and may be laminated.

Preferably, each stator has only two end faces.

The ultrasonic sector scanner according to the invention may also comprise an optical encoder assembly, means for generating a reference signal, and comparison means. The optical encoder assembly produces an angular position signal representing the actual angular position of the ultrasonic transducer around the axis. The reference signal generating means generates a reference signal representing the desired angular position of the ultrasonic transducer around the axis. The comparison means compares the reference signal to the angular position signal and generates an error signal representing the difference between the reference signal and the angular position signal.

In this form of the invention, the driver means supplies an electric current to the first coil if the error signal is positive and supplies an electric current to the second coil is the error signal is negative.

The ultrasonic sector scanner according to the invention may further comprise a housing, a flexible membrane, and a retaining ring. The housing has a rigid cylindrical wall extending completely around the rotors, stators and ultrasonic transducer. The wall has an outer surface having a groove therein extending completely around the perimeter of the wall.

The flexible membrane has a flexible cylindrical membrane portion having a perimeter which is approximately equal to the perimeter of the wall of the housing at the location of the grove. The cylindrical membrane portion has an inside surface with a rib molded therein and extending completely around the perimeter of the membrane portion. The rib protrudes into the groove in the wall of the housing.

The retaining ring has a perimeter approximately equal to the perimeter of the cylindrical membrane portion, and is arranged around the cylindrical membrane portion. The retaining ring presses the rib in the membrane into the groove in the housing.

The housing wall and the flexible membrane may form a recess in which the heat-shrink tube is arranged.

The ultrasonic sector scanner according to the invention may further comprise a rigid nose piece connected to the first end of the cylindrical wall of the housing. The nose piece is arranged under the flexible membrane and partially closes the open end of the housing. In order to provide an increased skin contact area when the flexible membrane portion of the ultrasonic sector scanner is pressed against the skin of a patient being examined, the nose piece is spaced from the flexible membrane.

The ultrasonic sector scanner according to the invention oscillates the ultrasonic transducer with a highly constant velocity. During the oscillation, each reversal of direction of the transducer is very fast. As a result, a uniform scan is produced.

The servo-control system in the ultrasonic sector scanner according to the invention accurately and precisely determines the angular position and velocity of the transducer as a function of time.

The flexible membrane cover according to the invention is, advantageously, quickly and easily replaceable. By providing the nose piece spaced from the membrane, increased skin contact area is provided when the membrane is pressed against the skin of the patient being examined.

DESCRIPTION OF THE PREFERRED EMBODIMENTS

Figure 1:
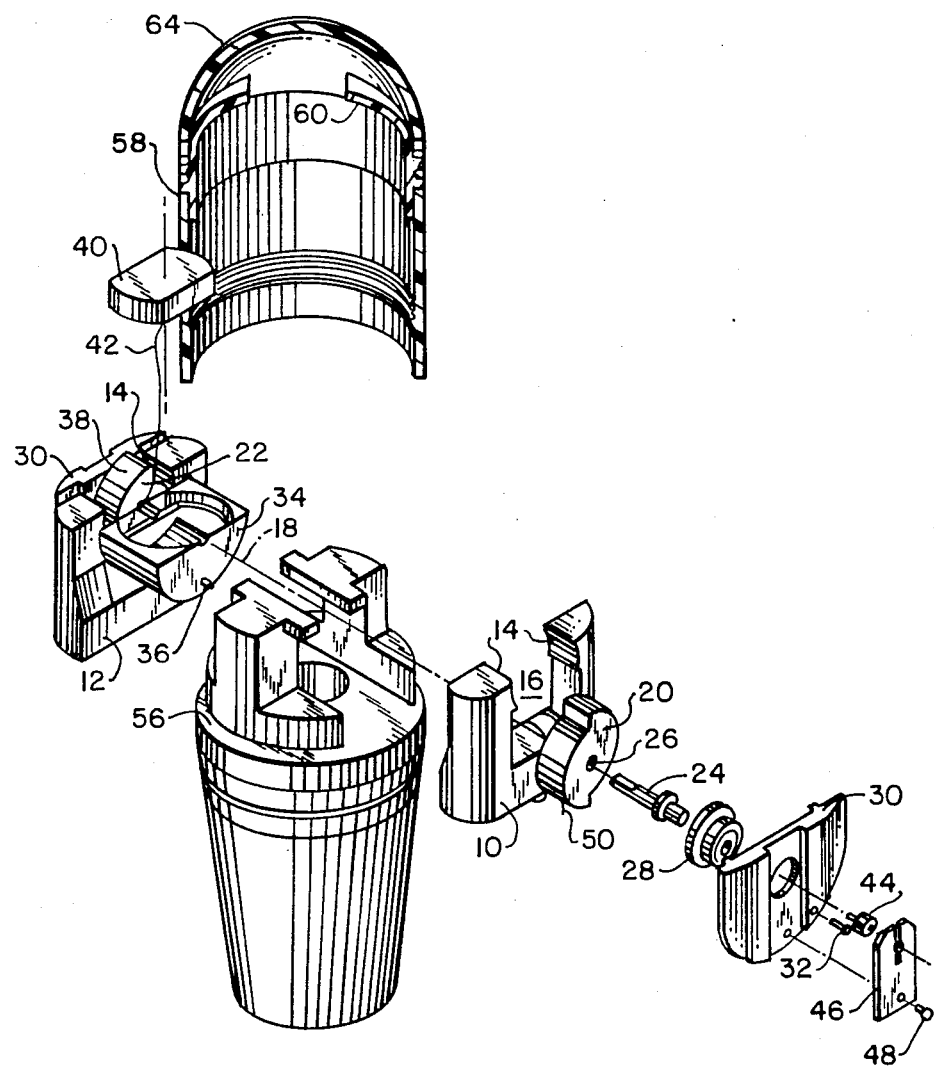
FIG. 1 is an exploded, perspective view of a part of an ultrasonic sector scanner according to the invention.
Figure 2:
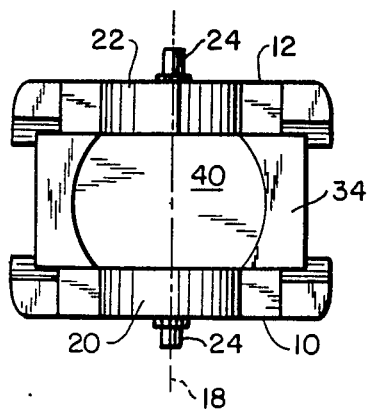
FIG. 2 is a top view of a portion of the motor/transducer assembly of the ultrasonic sector scanner according to the invention.

Referring to FIGS. 1 and 2, the ultrasonic sector scanner includes a first stator 10 and a second stator 12. Both stators have a magnetic permeability greater than that of air and may be, for example, 4% silicon-iron or some other ferromagnetic material. The stators 10 and 12 may be laminated, but this is not an important requirement at low oscillating frequencies.

The first and second stators 10 and 12 each have two end faces 14. The end faces 14 of the first stator 10 are arranged on opposite sides of a longitudinal axis 18 with a gap 16 therebetween. The end faces 14 of the second stator 12 are also arranged on opposite sides of longitudinal axis 18 with a gap therebetween. Preferably, the end faces 14 of each stator are symmetrical about axis 18.

The second stator 12 is spaced from the first stator 10 in the longitudinal direction. As shown in FIG. 1, each stator 10 and 12 is arranged to define a magnetic flux path parallel to a plane which is perpendicular to the axis 18.

The ultrasonic sector scanner also includes a first rotor 20 and a second rotor 22. Both rotors 20 and 22 have magnetic permeabilities greater than that of air. The rotors may be, for example, 4% silicon-iron or some other ferromagnetic material. They may also be laminated, however this is not necessary when low oscillating frequencies are used.

First rotor 20 is arranged on the longitudinal axis 18 between the end faces 14 of the first stator 10. Second rotor 22 is arranged on the longitudinal axis 18 between the end faces 14 of the second stator 12. The first and second rotors 20 and 22 are mounted in bearings so as to be rotatable about the longitudinal axis 18. The bearings include shafts 24 arranged in central bores 26 of the rotors. The ends of shaft 24 are, in turn, mounted in bores in bearings 28. Each shaft 24 and its associated bearing 28 forms a sleeve bearing.

The assembly of rotors, shafts, and bearings is supported by bearing housings 30. One bearing housing 30 is fastened to the first stator 10, and the other bearing housing 30 is fastened to stator 12. The bearing housings 30 are fastened to the stators by screws, such as 32.

Arranged between the rotors 20 and 22 is a transducer holder 34. An end of each shaft 24 engages the transducer holder 34.

The transducer holder 34 is provided with pins 36 on either side thereof. Each pin 36 engages a bore (not shown) in a rotor so that the rotors 20 and 22 and the transducer holder 34 all rotate around the longitudinal axis 18 as a single assembly.

As shown in FIG. 1, each rotor 20 and 22 has an outer surface 38. The outer surface 38 of first rotor 20 is spaced from the end faces 14 of first stator 10 by gaps (FIG. 2). The thicknesses of these gaps decrease as the rotor rotates less than 360° in a first direction (clockwise in FIG. 1) from a first angular position to a second angular position.

The outer surface 38 of second rotor 22 is spaced from the end faces 14 of the second stator 12 by gaps having thicknesses which decrease as the second rotor 22 rotates less than 360° in a second direction (counterclockwise in FIG. 1) opposite to the first direction from the second angular position to the first angular position.

Both of the outer surfaces 38 surround the longitudinal axis 18. The first and second rotors 20 and 22 shown in FIG. 1 are oriented between the first and second angular positions.

An ultrasonic transducer 40 is mounted in the transducer holder 34. Thus, transducer 40 is connected to the rotors 20 and 22 and is arranged to be rotatable about the longitudinal axis 18 with the rotors.

Transducer 40 is provided with two electrical leads 42 (only one shown) for energizing the transducer and for transmitting electrical signals generated in the transducer by echo pressure signals incident thereon. Electrical signals are passed to and from leads 42 by way of brushes 44 and brush holders 46. Each brush holder 46 is fastened to a bearing housing 30 by way of a screw 48.

In order to operate the ultrasonic sector scanner, magnetic flux must be generated in the stators. For this purpose, each stator 10 and 12 is provided with an electrically conductive wire coil 50 wound around the center thereof. When an electric current is passed through the coil 50 on the first stator 10, the rotor/transducer assembly will rotate clockwise until the thickness of the gaps between the outer surface 38 of the first rotor 20 and the end faces 14 of the first stator 10 are minimized.

When the electric current is removed from the coil 50 on the first stator 10, and an electric current is supplied to the coil 50 (not shown) on the second stator 12, then the rotor/transducer assembly will rotate counterclockwise as shown in FIG. 1. The rotor/transducer assembly will rotate counterclockwise until the thicknesses of the gaps between the outer surface 38 of the second rotor 22 and the end faces 14 of the second stator 12 are minimized. Thus, by alternately supplying electric currents to the coil on the first stator and the coil on the second stator, the ultrasonic transducer 40 can be made to oscillate.

In order to control the angular position and the angular velocity of the ultrasonic transducer 40 as a function of time, a servo-control system is provided. The servo-control system includes an optical encoder assembly for producing an angular position signal representing the actual angular position of the ultrasonic transducer around the longitudinal axis 18. The optical encoder assembly is not shown in FIG. 1, but is shown in FIG. 4.

Figure 4:
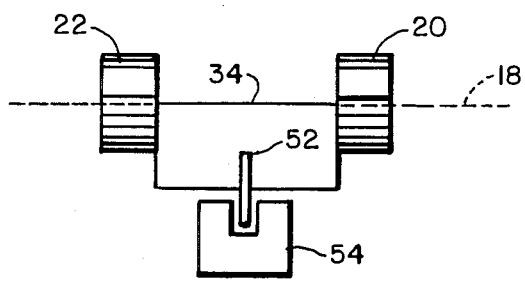
FIG. 4 is a side elevation view of a portion of the motor/transducer assembly having an optical encoder assembly.

The optical encoder assembly shown in FIG. 4 is preferably a commercially available device made by the Litton Encoder Division of Litton Industries. It includes an encoder disc 52 affixed to the bottom of the transducer holder 34 and a reader assembly 54 affixed to the base 56 (FIG. 1) of the ultrasonic sector scanner.

As is well known, the encoder disc 52 is provided with a series of slits distributed at different angular positions around the axis 18. The reader assembly 54 includes a light source, a light detector, and a second disc, all fixed relative to one another. The light source illuminates the light detector though the slits in the fixed disc. Whenever the slits in the moving encoder disc 52 line up with the slits in the fixed disc, a pulse is produced in the output signal of the light detector. By suitable signal processing of the output of the light detector, the angular position and angular velocity of the encoder disc 52, and hence also the ultrasonic transducer 40, can be determined.

The servo-control system further includes means for generating a reference signal representing the desired angular position of the ultrasonic transducer around the axis. The reference signal may also include information regarding the desired angular velocity of the ultrasonic transducer.

Figure 3:
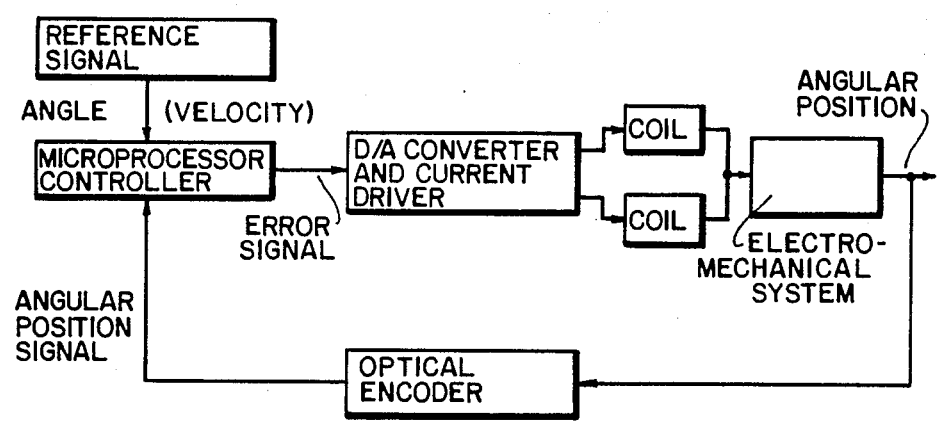
FIG. 3 is a block diagram of the servo-control system of the ultrasonic sector scanner according to the invention.

Referring again to FIG. 3, the servo-control system includes comparsion means for comparing the reference signal to the angular position signal. In FIG. 3 the comparison means is a microprocessor controller. The microprocessor controller generates an error signal representing the difference between the reference signal and the angular position signal.

If the reference signal includes a velocity signal, the microprocessor controller can derive an actual velocity signal by digitally differentiating the actual angular position signal from the optical encoder. In this case, the error signal will include a position error signal and a velocity error signal.

In order to supply power to the coils 50 50 which are wound around the stators 10 and 12, the servo-control system includes driver means. As shown in FIG. 3, the driver means includes a current driver and a digital-to-analog converter. The digital-to-analog converter is provided because the output of the microprocessor controller is a digital signal.

In order to cause the ultrasonic transducer 40 to track the reference signal, the current driver supplies an electric current to the first coil 50 (wound around the first stator 10) if the error signal from the microprocessor controller is positive. The current drier supplies an electrical current to the second coil 50 (wound around second stator 12) if the error signal from the microprocessor controller is negative.

In the block diagram of FIG. 3, the electro-mechanical system represents the stators, rotors, shafts, bearings, crystal holder, and ultrasonic transducer.

Figure 5:
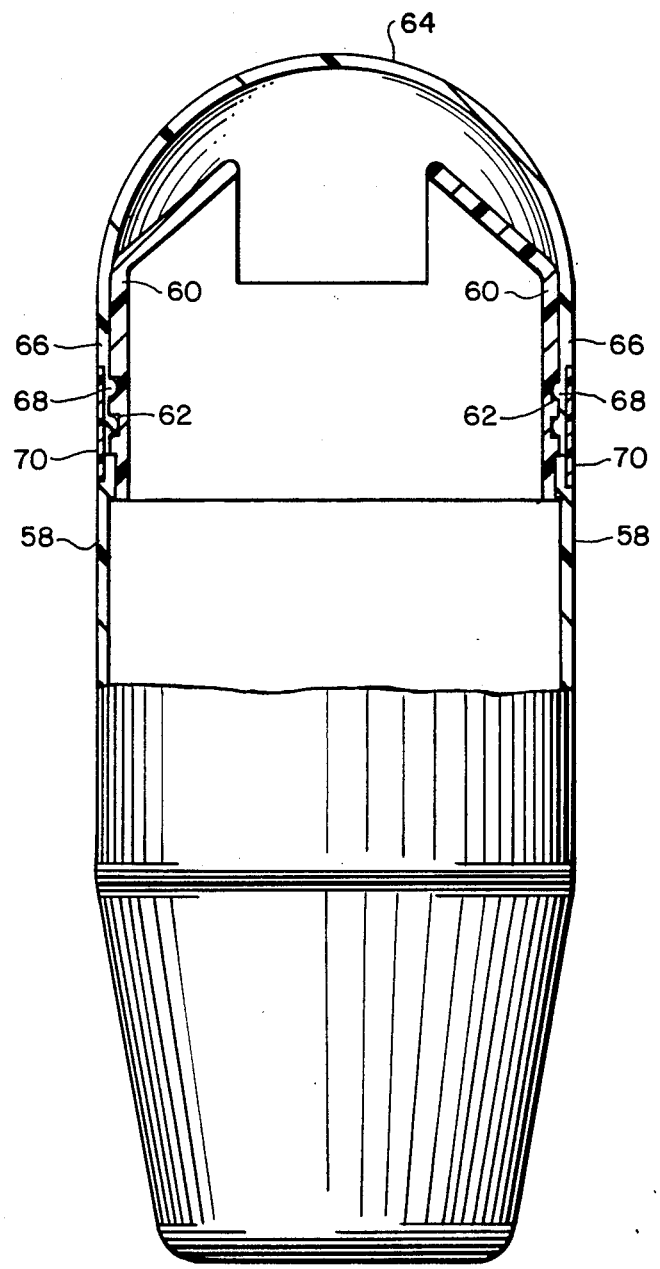
FIG. 5 is a side elevation view, partly in cross-section of the outer casing of the ultrasonic sector scanner according to the invention.

The cover assembly for the ultrasonic sector scanner according to the invention is shown in FIG. 5. As shown here, the ultrasonic sector scanner includes a housing 58 having rigid cylindrical wall with a first open end (arranged at the top as shown in FIG. 5). The housing 58 extends completely around the rotors, stators and ultrasonic transducer (which, for simplicity, are not shown in FIG. 5). The cylindrical wall of the housing includes a nose piece 60.

The cylindrical wall has an outer surface with a perimeter. The outer surface of the wall has at least one groove 62 therein extending completely around the perimeter of the wall.

The ultrasonic sector scanner further includes a flexible membrane 64 having a flexible cylindrical membrane portion 66. Membrane 64 is, for example, made of silicone rubber. The cylindrical membrane portion 66 has a perimeter which is approximately equal to the perimeter of the cylindrical wall at the location of the groove 62. The cylindrical membrane portion 66 also has an inside surface with at least one rib 68 molded therein. Rib 68 extends completely around the perimeter of the membrane portion 66. The rib 68 protrudes into the groove 62 in the wall of the housing.

Finally, the cover assembly includes a heat-shrink tube 70 also having a perimeter approximately equal to the perimeter of the cylindrical membrane portion 66.

The tube 70 is arranged around the cylindrical membrane portion 66, and functions as a retaining ring by being shrunken to press the ribs 68 into the grooves 62. As a result, a tight seal is formed between the housing and the membrane.

As shown in FIG. 5, the housing wall and the flexible membrane preferably form a recess into which the heat-shrink tube 70 is arranged.

Instead of a heat-shrink tube, another retaining ring may be used. For example, a stainless steel retaining ring can be press fit into the recess.

In addition to having a cylindrical wall portion, the nose piece 60 also has an inwardly projecting portion 72 which partially closes the open end of the housing. This inwardly-projecting portion 72 of the nose piece 60 is spaced from the flexible membrane 64 so that the ultrasonic sector scanner will provide an increased skin contact area when the flexible membrane 64 is pressed against the skin of a patient being examined.

What is claimed is:

1. An ultrasonic sector scanner comprising:
   a first stator having a magnetic permeability greater than that of air, said first stator having two end faces opposite each other with a gap therebetween, said end faces being arranged on opposite sides of a longitudinal axis;
   a second stator having a magnetic permeability greater than that of air, said second stator having two end faces opposite each other with a gap therebetween, said end faces being arranged on opposite sides of the longitudinal axis, the second stator being spaced from the first stator in the longitudinal direction;
   a first rotor having a magnetic permeability greater than that off air arranged on the longitudinal axis between the end faces of the first stator, said first rotor arranged to be rotatable about the longitudinal axis, said first rotor having an outer surface surrounding the longitudinal axis, said outer surface being spaced from the end faces of the first stator by gaps having thicknesses which decrease as the rotor rotates less than 360° in a first direction from a first angular position to a second angular position;
   a second rotor having a magnetic permeability greater than that of air arranged on the longitudinal axis between the end faces of the second stator, said second rotor connected to the first rotor and arranged to be rotatable about the longitudinal axis with the first rotor, said second rotor having an outer surface surrounding the longitudinal axis, said outer surface being spaced from the end faces of the second stator by gaps having thicknesses which decrease as the rotors rotate less than 360° in a second direction opposite to the first direction from the second angular position to the first angular position; and
   an ultrasonic transducer connected to the rotors and arranged to be rotatable about the longitudinal axis with the rotors.

2. An ultrasonic sector scanner as claimed in claim 1, further comprising means for generating magnetic flux in the stators.

3. An ultrasonic sector scanner as claimed in claim 2, characterized in that the magnetic flux-generating means comprises:
   a first electrically conductive wire coil wound around the first stator;
   a second electrically conductive wire coil wound around the second stator; and
   driver means for alternately supplying electric currents to the first coil and to the second coil.

4. An ultrasonic sector scanner as claimed in claim 3, further comprising:
   an optical encoder assembly for producing an angular position signal representing the actual angular position of the ultrasonic transducer around the axis;
   means for generating a reference signal representing the desired angular position of the ultasonic transducer around the axis;
   comparison means for comparing the reference signal to the angular position signal and for generating an error signal representing the difference between the reference signal and the angular position signal;
   driver means for supplying an electric current to the first coil if the error signal is positive and for supplying an electric current to the second coil if the error signal is negative.

5. An ultrasonic sector scanner as claimed in claim 4, characterized in that the end faces of each stator are symmetrical about the longitudinal axis.

6. An ultrasonic sector scanner as claimed in claim 5, characterized in that each stator defines a magnetic flux path parallel to a plane which is perpendicular to the longitudinal axis.

7. An ultrasonic sector scanner as claimed in claim 6, characterized in that the rotors and stators are made of ferromagnetic material.

8. An ultrasonic sector scanner as claimed in claim 7, characterized in that the rotors and stators are laminated.

9. An ultrasonic sector scanner as claimed in claim 1, characterized in that each stator has only two end faces.

10. An ultrasonic sector scanner as claimed in claim 1, further comprising:
    a housing having a rigid cylindrical wall with a first open end, said wall extending completely around the rotors, stators and ultrasonic transducer, said wall having an outer surface with a perimeter, the outer surface of the wall having a groove therein extending completely around the perimeter of the wall;
    a flexible membrane having a flexible cylindrical membrane portion, said membrane portion having a perimeter which is approximately equal to the perimeter of the wall of the housing at the location of the groove, said cylindrical membrane portion having an inside surface with a rib molded therein and extending completely around the perimeter of the membrane portion, said rib protruding into the groove in the wall of the housing; and
    a retaining ring having a perimeter approximately equal to the perimeter of the cylindrical membrane portion, said tube being arranged around the cylindrical membrane portion and being shrunken to press the rib into the groove.

11. An ultrasonic sector scanner as claimed in claim 10, characterized in that the retaining ring is a heat-shrink tube.

12. An ultrasonic sector scanner as claimed in claim 11, characterized in that the housing wall and the flexible membrane form a recess in which the heat-shrink tube is arranged.

13. An ultrasonic sector scanner as claimed in claim 12, further comprising a rigid nose piece connected to the first end of the cylindrical wall of the housing, said nose piece arranged under and spaced from the flexible membrane, said nose piece partially closing the open end of the housing.

14. An ultrasonic sector scanner comprising:
- a housing having a rigid cylindrical wall with a first open end, said wall extending completely around an ultrasonic transducer, said wall having an outer surface with a perimeter, the outer surface of the wall having a groove therein extending completely around the perimeter of the wall;
- a flexible membrane having a flexible cylindrical membrane portion, said membrane portion having a perimeter which is approximately equal to the perimeter of the wall of the housing at the location of the groove, said cylindrical membrane portion having an inside surface with a rib molded therein and extending completely around the perimeter of the membrane portion, said rib protruding into the groove in the wall of the housing; and
- a retaining ring having a perimeter approximately equal to the perimeter of the cylindrical membrane portion, said tube being arranged around the cylindrical membrane portion and being shrunken to press the rib into the groove.

15. An ultrasonic sector scanner as claimed in claim 14, characterized in that the retaining ring is a heat-shrink tube.

16. An ultrasonic sector scanner comprising:
- a housing having a rigid cylindrical wall with a first open end, said wall extending completely around an ultrasonic transducer, said wall having an outer surface with a perimeter;
- a rigid nose piece connected to the first end of the cylindrical wall, said nose piece having an inwardly projecting portion partially closing the open end; and
- a flexible dome-shaped membrane covering the rigid nose piece, said membrane having a flexible cylindrical membrane portion, said cylindrical membrane portion being connected to the perimeter of the cylindrical wall of the housing;
- characterized in that the dome of the membrane is spaced from the inwardly projecting portion of the nose piece.

* * * * *